Dec. 19, 1950     F. A. HEDWALL ET AL     2,534,444
AUTOMATIC PET FEEDER
Filed Feb. 15, 1949

INVENTORS
Fredrick A. Hedwall
BY Emil Meyer
Philip A. Friedell
Attorney

Patented Dec. 19, 1950

2,534,444

UNITED STATES PATENT OFFICE 2,534,444

AUTOMATIC PET FEEDER

Fredrick A. Hedwall, Sacramento, and
Emil Meyer, San Francisco, Calif.

Application February 15, 1949, Serial No. 76,453

15 Claims. (Cl. 161—10)

This invention relates to improvements in pet feeders, and particularly to feeders which are controlled for operation at any desired time within a maximum time limit of at least 24 hours, so that pets can be fed at some specific time, even the next day, without attention by any individual.

The feeding of pets has always been a problem when the owner wishes to, or is compelled to be absent for a day or two, the only recourse being to have someone call at some specified time and take care of the feeding.

With this invention the food can be prepared and placed in the feeder, the feeder locked and a timer set for the feeding time, and the timer set in operation. When the feeding time is reached, the feeder opens and the container with the food is ejected for easy access to the pet, thus eliminating the necessity for having someone call at that appointed time to take care of the feeding.

The food is fully protected against dust, rain and snow until the actual feeding time, as also against flies and other insects, and the container is easily removed for cleaning and filling.

The objects and advantages of the invention are as follows:

First, to provide a feeder for pets which can be adjusted to feed the pet at any appointed time within a period of at least twenty-four hours so that the feeding can be arranged for the following day, if desired.

Second, to provide a feeder as outlined which is sanitary, which is easily cleaned, and which protects the food from the elements and from flies and other insects until the food is dispensed.

Third, to provide a feeder as outlined which has a removable food container and which ejects completely when the feeding time has arrived, for convenient access to the pet.

Fourth, to provide a feeder as outlined which can be adjusted for operation over relatively extended periods, of not less than twenty-four hours maximum.

Fifth, to provide a feeder as outlined with timing means which is easily adjusted for any desired time period.

Sixth, to provide a feeder as outlined which is simple in construction, positive in operation, light in weight, and convenient to load with the food.

In describing the invention reference will be had to the accompanying drawings, in which.

Figure 1:
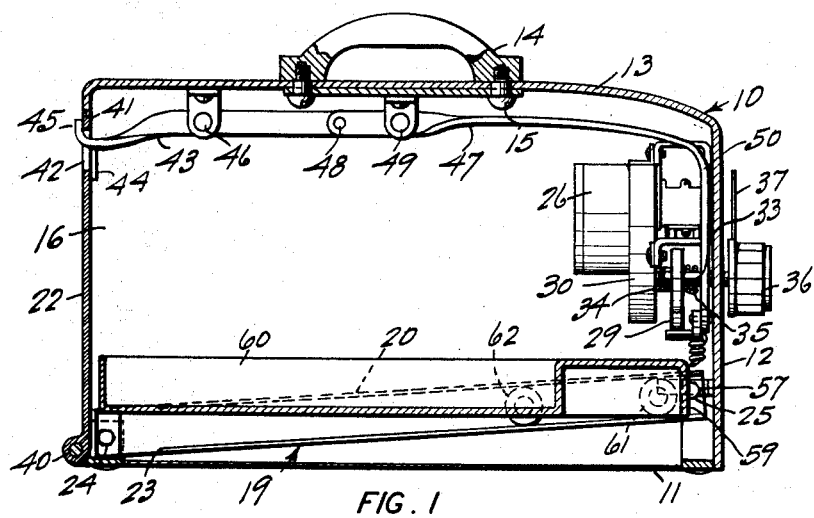
Fig. 1 is a longitudinal sectional elevation through the invention.
Figure 2:
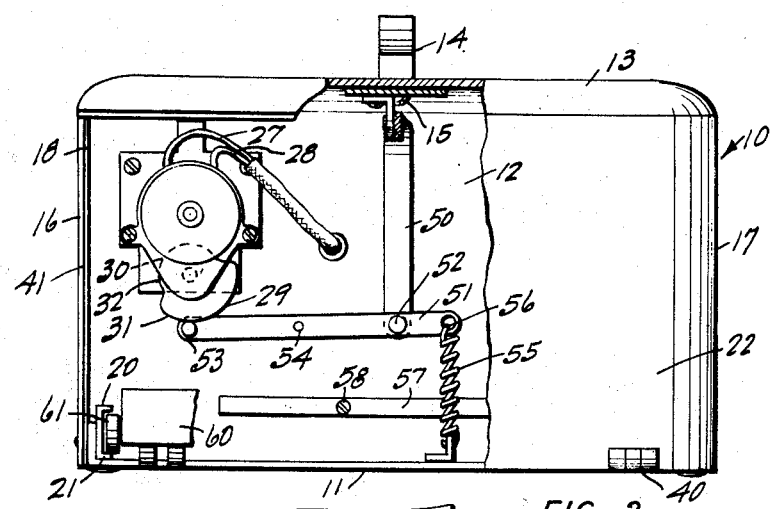
Fig. 2 is a front elevation with a portion of the door broken away to show the operating mechanism mounted on the back wall, and to illustrate the track and mounting for the food container.
Figure 3:
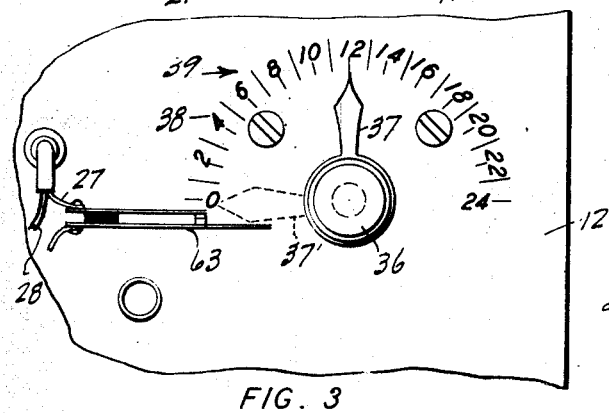
Fig. 3 is an enlarged fragmentary view of the back wall showing the time adjusting means.

The invention includes a case 10 having a bottom 11 to rest on a surface, a rear end wall 12, top wall 13 which is supplied with a carrying handle 14 attached as indicated at 15, and side walls 16 and 17, and a door frame 18 for the front end.

Mounted on the inside of each side wall is a track 19 of channel shape having a top flange 20 and a bottom flange 21, with the bottom flange terminating in slightly spaced relation to the door 22 as indicated at 23, and this track is mounted inclinably toward the door as shown, the tracks being secured at their respective ends as indicated at 24 and 25.

Mounted on the rear wall 12 is a timing device which may be of the spring driven type, but is preferably of the electrically driven type as shown and comprising a motor 26 having leads 27 and 28 for connection to a source of current; the motor very slowly driving a cam 29 through a high ratio speed reducer 30 and requiring at least 48 hours to turn the cam through one revolution, thus, by equal division of the high side 31 and the low side 32 of the cam, making it possible to operate the feeder at any point within 24 hours, or to increase this time by extending the high side farther and shortening the low side, making it possible to set the feeder early one morning and have the feeding take place at noon of the second day, thus providing for feeding for two days by using a double feeder or two feeders set for the respective times on the respective days, or two or more feedings each day by providing the necessary feeders.

This cam has a shaft 33 which is provided with a clutch arrangement 34 and is urged into engagement by a spring 35, the shaft extending through the rear wall and having a knob 36 mounted thereon and provided with an indicator 37 for setting the elapse time period by the indices 38 on the hour scale 39.

The door 22 is hinged at its lower end as indicated at 40; both, the periphery of the door and the door frame being stepped as indicated at 41 to provide a seal, and a latch opening is formed at 42 for the latch 43 which has a skirt 44 to seal the opening, thus providing a sealed enclosure for the food.

The latch 43 is operated by the cam 29 through any suitable means and is shown as comprising the latch portion 43 which is turned up at its outer extremity as indicated at 45 to engage the upper end of the door above the slot 42, and being intermediately pivoted at 46 with its other end pivoted to the operating lever 47 as indicated at 48 with this operating lever intermediately pivotally supported at 49, and having its other end depending as indicated at 50 and terminating in a pivotal attachment to the cam lever 51 as indicated at 52, this cam lever having a roller 53 at one end for cooperation with the cam 29 and being intermediately pivotally mounted at 54, and having a tension spring 55 coupled at its other end with the depending portion of the operating lever pivoted thereto between the pivotal mounting 54 and the spring attachment at 56, the spring normally keeping the roller 53 in contact with the cam.

Thus, when the roller 53 rides on the high side 31 of the cam, the depending portion of the operating lever is forced up against the urgence of the spring 55, raising the latch 45 to lock the door, and when the roller rides on the low side 30 of the cam, the spring 55 draws the said other end of the cam lever down, and with it the depending portion of the operating lever, and moving the latch down to release the door.

A leaf spring 57 is intermediately pivotally mounted on the back wall 12 as indicated at 58, with the two ends bowing outwardly or forwardly to cooperate with the rear end 59 of the food tray 60, and the tray is provided with two quite closely coupled wheels on each side near the rearward end as indicated at 61 and 62, with the forward one 62 of the two wheels, mounted at a lower level relative to the longitudinal axis of the tray, so that the tray is level as indicated while the track slopes down.

The ejection of the tray is controlled by the door and actuated by the leaf spring. When the door is unlatched by the cam, the door drops down, releasing the tray which is forced forward by the leaf spring, and the tray rides down the inclined track until the front wheels 62 reach the end 23 of the lower track flange, the wheel dropping over the edge and allowing the tray to drop down to rest on the door, and preventing the tray from being pulled out and away from the feeder as the front wheels lock in the recess formed between the edge 23 and the door bottom edge.

To operate the feeder, the tray is removed, the food is placed therein, the tray is placed back in position in the tracks, then forced back against the urgence of the leaf spring 57 and the door closed and held closed while by means of the knob 36 the pointer 37 is adjusted to the number of elapse hours until feeding is to take place. The door is then released as the turning of the knob 36 causes the latch to lock the door closed. Turning the knob simultaneously releases the switch 63 to close to complete circuit to the motor, the knob being first pulled out against the urgence of the spring 35 for making the adjustment and then released to engage the cam shaft to operate therewith. When the cycle has been completed, the switch is opened by the knob and pointer system to break the circuit and stop the motor.

We claim:

1. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; said track comprising a track for each side of the housing and having each an upper flange and a lower flange, with the forward terminal portion of the lower flange cut away, and said tray having two relatively closely related wheels on each side near the rearward end with the forward ones of said wheels mounted in a plane below the plane of the rearward ones of said wheels to maintain the tray level while supported by the sloping tracks, and with the forward wheels dropping over the forward end of the lower flange to drop the tray onto the open door and lock the wheels to prevent complete removal of the tray except by raising the front of the tray.

2. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; said timing means comprising a cam and high ratio driving means therefor, and a cam lever cooperating with said cam and having operative connection with said latch to latch the door when the cam is in one position and to release the latch to release the door to open when the cam is in another position.

3. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; a compression spring in said housing cooperative with the rearward end of said tray to propel the tray through the opening formed by the open door when the door is opened and to urge the door to open through urgence through the tray.

4. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; said track comprising a track for each side of the housing and having an upper flange and a lower flange, with the forward terminal portion of the lower flange cut away, and said tray having two relatively closely related wheels on each side near the rearward end with the forward ones of said wheels mounted in a plane below the plane of the rearward ones of said wheels to maintain the tray level while supported by the sloping tracks, and with the forward wheels dropping over the forward end of the lower flange to drop the tray onto the open door and lock the wheels to prevent complete removal of the tray except by raising the front of the tray; the edges of said door having stepped cooperation with the door frame to form a seal against ingress of dust, moisture or insects to form a sealed enclosure for the food before dispensing.

5. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; said track comprising a track for each side of the housing and having each an upper flange and a lower flange, with the forward terminal portion of the lower flange cut away, and said tray having two relatively closely related wheels on each side near the rearward end with the forward ones of said wheels mounted in a plane below the plane of the rearward ones of said wheels to maintain the tray level while supported by the sloping tracks, and with the forward wheels dropping over the forward end of the low flange to drop the tray onto the open door and lock the wheels to prevent complete removal of the tray except by raising the front of the tray; said timing means comprising a cam and high ratio driving means therefor, and a cam lever cooperating with said cam and having operative connection with said latch to latch the door when the cam is in one position and to release the latch to release the door to open when the cam is in another position.

6. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; said track comprising a track for each side of the housing and having each an upper flange and a lower flange, with the forward terminal portion of the lower flange cut away, and said tray having two relatively closely related wheels on each side near the rearward end with the forward ones of said wheels mounted in a plane below the plane of the rearward ones of said wheels to maintain the tray level while supported by the sloping tracks, and with the forward wheels dropping over the forward end of the lower flange to drop the tray onto the open door and lock the wheels to prevent complete removal of the tray except by raising the front of the tray; a compression spring in said housing cooperative with the rearward end of said tray to propel the tray through the opening formed by the open door when the door is opened and to urge the door to open through urgence through the tray.

7. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; the edges of said door having stepped cooperation with the door frame to form a seal against ingress of dust, moisture or insects to form a sealed enclosure for the food before dispensing; said timing means comprising a cam and high ratio driving means therefor, and a cam lever cooperating with said cam and having operative connection with said latch to latch the door when the cam is in one position and to release the latch to release the door to open when the cam is in another position.

8. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; said timing means comprising a cam and high ratio driving means therefor, and a cam lever cooperating with said cam and having operative connection with said latch to latch the door when the cam is in one position and to release the latch to release the door to open when the cam is in another position; a compression spring in said housing cooperative with the rearward end of said tray to propel the tray through the opening formed by the open door when the door is opened and to urge the door to open through urgence through the tray.

9. A pet feeder comprising; a housing having a door at one end, and means for latching said door in closed position; a track within said housing and sloping downwardly toward said door, a tray for food within said housing and vehicularly operating in said track, and timing means adjustable at will for keeping said door latched for a selected time period and releasing said door to open at the termination of said period and releasing said tray for projection from the housing; said track comprising a track for each side of the housing and having each an upper flange and a lower flange, with the forward terminal portion of the lower flange cut away, and said tray having two relatively closely related wheels on each side near the rearward end with the forward ones of said wheels mounted in a plane below the plane of the rearward ones of said wheels to maintain the tray level while supported by the sloping tracks, and with the forward wheels dropping over the forward end of the lower flange to drop the tray onto the open door and lock the wheels to prevent complete removal of the tray except by raising the front of the tray; said timing means comprising a cam and high ratio driving means therefor, and a cam lever cooperating with said cam and having operative connection with said latch to latch the door when the cam is in one position and to release the latch to release the door to open when the cam is in another position; a compression spring in said housing cooperative with the rearward end of said tray to propel the tray through the opening formed by the open door when the door is opened and to urge the door to open through urgence through the tray.

10. A pet feeder comprising; a housing having a drop front door and side walls and a rear wall; a latch cooperative with said front door to lock the door in closed position, and timing means adjustable for any selective time period for operating said latch to release said door to open at the termination of said time period; a rail mounted on each side wall and sloping downwardly toward said door; a tray having wheels operating in said tracks to support said tray and with the wheels closely related near the rearward end of said tray and with the forward ones of said wheels mounted at a lower level than the rearward ones of said wheels to maintain the tray level while supported by said sloping rails, spring means cooperating between the rearward end of said tray and the housing for urging ejection of the tray and with the forward end cooperative with the door for release when the door opens.

11. A structure as defined in claim 10; said timing means comprising a cam and an operative connection between said cam and said latch to operate said latch to lock said door when the cam is in one position, and to release said latch to release said door when the cam is in another position; driving means for driving said cam at extremely low speed for rotation of one turn in not less than 24 hours, indicating means cooperative with said cam for setting the cam for any selective time period and including means for simultaneously initiating operation of said driving means; and for terminating operation of said driving means when said selected time period is completed.

12. A structure as defined in claim 10; said timing means comprising an electric motor having a high ratio speed reduction, and a cam driven thereby; a cam lever controlled by said cam in both directions and actuated thereby in one direction to latch said door and a spring for actuating said cam lever in the other direction to actuate said latch to release said door at the completion of a selected time period; a manually operative adjusting means for adjusting said cam for any time-elapse period, and a switch controlled by said cam for closing with adjustment of said adjusting means, and for opening said switch following completion of a selected time cycle.

13. A structure as defined in claim 10; said rails each having an upper flange and a lower flange with said wheels riding therebetween, and with the lower flanges terminating in substantially wheel diameter spacing from the door to drop the front wheels to lower the tray onto the open and lowered door.

14. A structure as defined in claim 10; said timing means comprising a cam and an operative connection between said cam and said latch to operate said latch to lock said door when the cam is in one position, and to release said latch to release said door when the cam is in another position; driving means for driving said cam at extremely low speed for rotation of one turn in not less than 24 hours, indicating means cooperative with said cam for setting the cam for any selective time period and including means for simultaneously initiating operation of said driving means; and for terminating operation of said driving means when said selected time period is completed; said rails each having an upper flange and a lower flange with said wheels riding therebetween, and with the lower flanges terminating in substantially wheel diameter spacing from the door to drop the front wheels to lower the tray onto the open and lowered door.

15. A structure as defined in claim 10; said timing means comprising an electric motor having a high ratio speed reduction, and a cam driven thereby; a cam lever controlled by said cam in both directions and actuated thereby in one direction to latch said door and a spring for actuating said cam lever in the other direction to actuate said latch to release said door at the completion of a selected time period; a manually operative adjusting means for adjusting said cam for any time-elapse period, and a switch controlled by said cam for closing with adjustment of said adjusting means, and for opening said switch following completion of a selected time cycle; said rails each having an upper flange and a lower flange with said wheels riding therebetween, and with the lower flanges terminating in substantially wheel diameter spacing from the door to drop the front wheels to lower the tray onto the open and lowered door.

FREDRICK A. HEDWALL.
EMIL MEYER.

REFERENCES CITED

The following references are of record in the file of this patent:

UNITED STATES PATENTS

| Number | Name | Date |
| --- | --- | --- |
| 1,961,008 | McEvoy | May 29, 1934 |
| 1,966,017 | McEvoy | July 10, 1934 |